United States Patent Office 2,885,328
Patented May 5, 1959

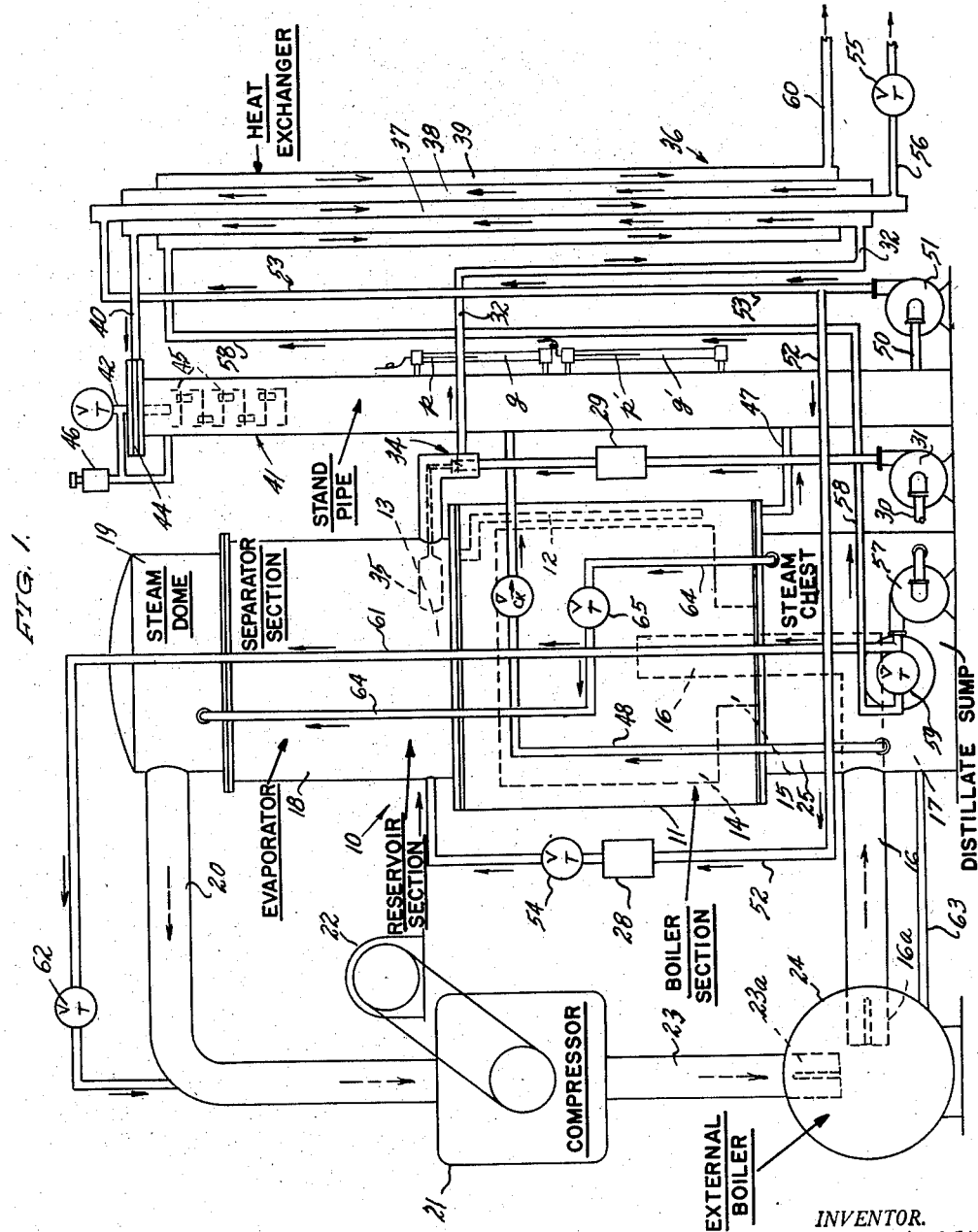

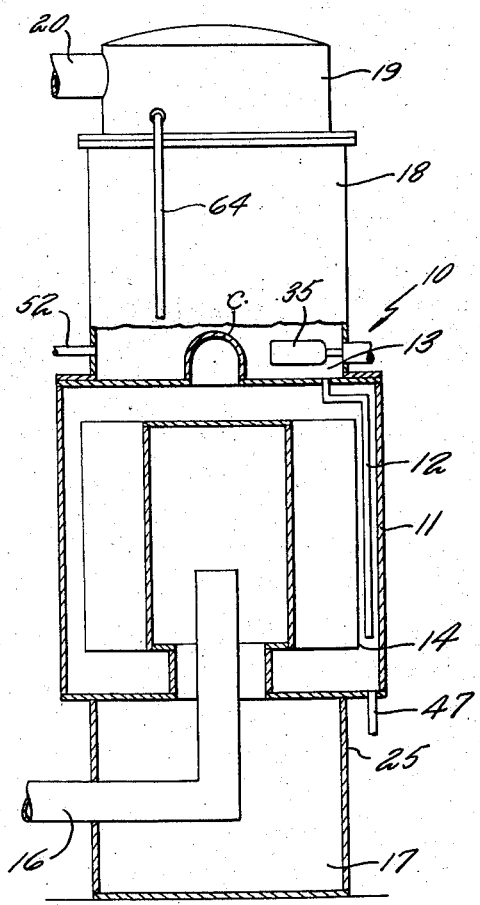
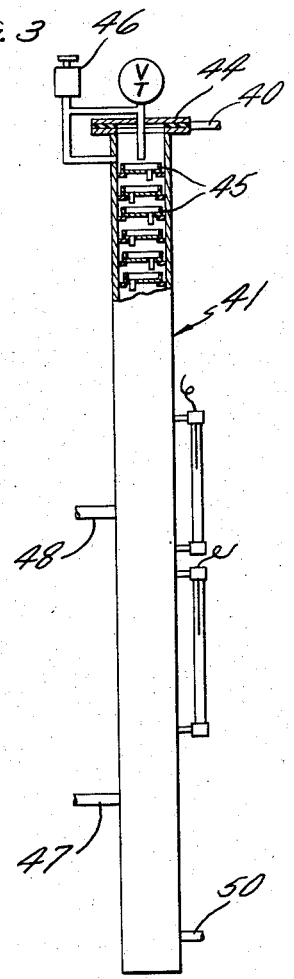

2,885,328

SEA WATER EVAPORATING AND DISTILLING PLANT

William R. Williamson, Wethersfield, Conn., assignor, by mesne assignments, to Emhart Manufacturing Company, Hartford, Conn., a corporation of Delaware Application December 30, 1953, Serial No. 401,253

7 Claims. (Cl. 202—167)

This invention relates to sea water distilling apparatus and, more specifically, to improvements in a sea water evaporating and distilling plant of the type which employs the principle of vapor compression. While the invention is described herein with specific reference to sea water distillation, it should be understood that the invention and apparatus are applicable to the purification of other liquids which can be distilled. Therefore, in the following specification and claims, the term "sea water" is used in a generic sense to include other impure liquids.

It is the general object of the invention to provide a sea water evaporating and distilling plant of the aforementioned type which includes means for preheating the sea water, means for removing substantially all of the air therefrom, and automatically operable flow control means for introducing the sea water to the evaporator in a mixture with brine, all to the end that the plant will be more stable and efficient and will operate more economically and with less maintenance than any generally similar plant heretofore known.

Other objects and advantages of the invention will become apparent to those skilled in the art from the following description taken in connection with the annexed drawing which, by way of preferred example only, illustrates one specific embodiment and in which, Fig. 1 is a diagrammatic illustration of a sea water evaporating and distilling plant incorporating the features of the present invention; Fig. 2 is a view of the evaporator forming a part of the distilling plant; and Fig. 3 is a vertical sectional view of the standpipe forming a part of the distilling plant.

Vapor compression type sea water evaporating and distilling plants may be described generally as including an evaporator for producing sea water vapors which are compressed and re-introduced to the evaporator to evaporate more sea water. The compressed vapors, in transferring heat to cause sea water evaporation, are cooled and condense to provide the salt-free distillate.

In the accompanying drawing, the evaporator is indicated generally by the reference numeral 10. The construction of the evaporator per se forms no part of the present invention and, therefore, the construction and operation of the evaporator will be described only generally herein. For a more specific description of evaporators of this type, reference may be had to the Williamson et al. Patent No. 2,604,957 and to the Williamson et al. Patent No. 2,649,408.

As is described in greater detail in said patents, the evaporator 10 comprises a generally cylindrical shell which is partitioned to define a boiler 11 wherein sea water is boiled and evaporated. The sea water is introduced to the boiler 11 through a pipe such as indicated at 12 extending from a reservoir defined in the evaporator shell above the boiler in that region thereof indicated generally by the reference numeral 13. The sea water is heated within the boiler 11 by steam which is introduced to a "basket" 14 disposed within the boiler in spaced generally concentric relationship. The basket 14 comprises a generally cylindrical, deeply corrugated shell which is closed at its top and which has an opening 15 in its bottom through which a steam inlet conduit 16 projects. As shown in the drawing, the opening 15 is sufficiently large to surround the steam inlet conduit in spaced relationship so as to provide an annular opening for the downward flow of condensate and appurtenant or "tramp" air from the basket 14 to a chest 25 wherein a condensate or distillate sump 17 is defined.

It will be readily understood that the heat transferred from the steam within the basket 14 to the sea water within the boiler 11 causes the sea water to boil, thus driving off a wet steam mixture therefrom. In boiling the sea water, the steam within the basket 14 is cooled and in cooling will pass through the opening 15 into the chest 25 wherein it provides the distillate supply in the sump 17.

The wet steam mixture driven from the sea water is passed through a conduit C from the boiler section of the evaporator through the reservoir section and then externally of the evaporator shell and then back into a separator section indicated generally by the reference numeral 18. The said separator section comprises a generally cylindrical chamber above the sea water reservoir 13 wherein the salt-retaining water is separated by centrifugal force from the wet steam mixture. The relatively dry steam is collected within the separator chamber and passed upwardly, as by a centrally disposed conduit, not shown, to a steam dome 19 which covers the top of the evaporator shell. Additional water may be separated from the steam within the dome 19 and then the dry steam is discharged therefrom through a conduit 20.

In accordance with conventional practice in vapor compression systems, a steam compressor or pump 21 is located in the discharge conduit 20 and is driven as by a motor 22 to compress the discharged salt-free steam and to raise the temperature thereof. The compressed steam is discharged from the compressor 21 into a conduit 23. In most vapor compression evaporating systems, the steam conduit 23 is connected directly to the evaporator steam inlet conduit 16 to introduce the compressed steam to the basket 14 for the purpose of boiling and evaporating more sea water.

The conventional practice in vapor compression evaporators is to provide heating elements in the distillate sump below the boiler and to boil the distillate to provide steam to institute sea water evaporation. This entails a distinct disadvantage. It is difficult to pass the steam into the evaporator boiler from the sump while at the same time permitting tramp air and condensate to pass from the boiler into the sump. Furthermore, it is difficult to vent air from a sump or chest which includes heating units and it has been found that vapor compression systems will operate most efficiently if the heating section is completely vented.

It is a feature of the present invention to provide an auxiliary boiler 24 externally of the evaporator. The external boiler 24 is located between the compressed steam conduit 23 and the evaporator steam inlet conduit 16 in what may be referred to as a series connection. That is, steam generated in the external boiler 24 is introduced to the evaporator basket 14 through the conduit 16 so that the flow of boiler-generated steam to the basket will not be opposed by counter-flow of condensate and tramp air in the annular opening 15, as would be the case if the old practice of generating steam in the sump 17 were utilized.

It has been found that an electrically heated boiler 24, which preferably includes a plurality of heating elements adapted for joint or several operation, will satisfy the requirements of this plant. The external boiler is, of course, utilized to full advantage in generating steam for the evaporator to institute operation thereof. After evaporation has started and the vapors of evaporation are compressed, the external boiler 24 can be deenergized or its heat substantially reduced. The compressed vapors which are passed through the external boiler to the evaporator will carry the heating load for continued operation.

There is another, less apparent advantage in providing the externally disposed boiler 24. In vapor compression systems, the steam pump or compressor sets up pulsations in the system, and particularly in the evaporator boiler, which reduce heat transfer efficiency. It is believed that such pulsations cause the relatively flat surfaces of the evaporator basket to vibrate with a loss of heat transfer efficiency. By providing the external boiler 24, a pulsation trap may be incorporated in the construction to eliminate or reduce basket vibration. More specifically, the compressed steam conduit 23 to the boiler is extended thereinto with the extending end portion 23a thereof being slotted as shown. The evaporator steam inlet conduit 16 is also extended into the boiler 24 with the extending end portion 16a thereof being slotted as shown. The technique of slotting conduit ends in a chamber is well known in the silencer art as a means of eliminating or smoothing out pulses so as to avoid the deleterious results of pulsating pressure.

The principle of adding heat energy to the sea water vapors by compression and using the latent heat of the compressed vapors to evaporate more sea water is known. It is a known practice to also preheat the sea water to facilitate evaporation thereof. One of the important features of the plant of the present invention resides in the inclusion of means for driving off air which is entrained in the sea water. Another important feature resides in the means for mixing sea water with brine before introduction to the evaporator.

The advantage of such improvements will, for the most part, be apparent. However, it should be particularly noted that air-free sea water can be more readily evaporated and the vapors derived therefrom are more readily condensed as the salt-free distillate. It should also be noted that a sea water-brine mixture can be evaporated with less scale deposit than occurs in the evaporation of an equal body of sea water. As will be pointed out hereinafter, the sea water-brine mixture is also used in a heat exchanger and it is, of course, an advantage to reduce scale formation in the heat exchanger.

The aforementioned features incorporated in the present plant as well as other improvements in structure will be fully understood from a general description of the apparatus followed by a more detailed description taken in connection with an explanation of the operation.

The sea water is introduced to the plant through a line 30 by means of a sea water pump 31 discharging into the line 32 wherein there is disposed an automatically operable metering valve 34. The metering valve 34, as will be more fully described hereinafter, is operated by a float 35 disposed in the sea water reservoir 13 within the evaporator 10. The sea water is pumped through the line 32 into a heat exchanger indicated generally by the reference numeral 36. As shown in the drawing, the heat exchanger 36 comprises three vertically extending concentric flow tubes 37, 38 and 39. As will be more fully understood hereinafter, the center tube 37 receives hot brine which flows from top to bottom, the intermediate tube 38 receives sea water from the line 32 connected to the bottom of the tube 38 for the passage of sea water upwardly within the tube 38 around the center tube 37. The outer tube 39 receives hot salt-free distillate for flow downwardly therein around the intermediate tube 38.

The sea water which passes through the heat exchanger tube 38 upwardly is discharged into the line 40 which extends into the top of an elongated generally cylindrical standpipe 41. The upper portion of the standpipe constitutes a sea water de-aerator while the lower portion thereof accommodates a column of brine. It is preferred that the sea water line 40 extend tangentially into the enlarged dome 44 of the standpipe so that the sea water will be whirled therein. In whirling within the dome, a substantial portion of the air which may be entrained within the sea water is separated therefrom and may be vented through a vent pipe 42 extending into the central portion of the top of the dome. Additional air separation is accomplished by spilling the sea water over a plurality of plates or pans 45 which are arranged in vertically spaced relationship within the de-aerating section of the standpipe 41. An air vent pipe is located between the dome 44 and the de-aerating pans 45 to discharge air separated from the sea water in spilling over the said pans. It will be noted that said vent pipe is connected to vent pipe 42 and extends to a valved vent member 46 of conventional structure which is adapted to close in the event water or steam should flow through the air vent pipes into the member 46.

The sea water which flows downwardly over the pans is mixed with the column of brine within the standpipe. The brine is introduced to the standpipe by a conduit 47 which extends between the standpipe 41 and the boiler chamber 11 and which is arranged to drain brine from the boiler. Air separation from the sea water is further facilitate by venting steam and tramp air from the evaporator to the brine standpipe through a line 48 which extends from the chest 25. Any steam which is passed through the line 48 into the brine standpipe will pass upwardly therein and entrain air from the sea water and be released from the standpipe 41 through the vent 46.

The mixture of the brine and de-aerated sea water is withdrawn from the standpipe through a line 50 by means of a pump 51. The sea water-brine mixture is discharged from the pump 51 through two branch lines 52 and 53 which extend, respectively, to the sea water reservoir 13 in the evaporator 10 and to the top of the brine tube 37 in the heat exchanger 36. Flow through the line 52 to the evaporator reservoir 13 is controlled by a manually operable valve 54 and flow through the line 53 and the heat exchanger 36 is controlled by a manually operable valve 55 connected in a brine discharge line 56 which extends from the bottom of the brine tube 37 in the heat exchanger.

The sea water-brine mixture which enters the evaporator reservoir 13 flows from the reservoir through the pipe 12 into the boiler 11 wherein it is evaporated. As previously described, the wet steam mixture driven from the boiler is directed into the separator 18 for water separation and into the steam dome 19 for discharge from the evaporator. The steam is discharged through the conduit 20 and compressed and may even be somewhat superheated by the compressor 21 before it is recirculated to the evaporator through the boiler 24 and steam inlet conduit 16. Upon being discharged into the basket 14, the steam gives up its heat to the sea water within the boiler and condenses within the basket and flows into the chest 25 as a fresh water distillate which is collected in the sump 17.

The fresh water distillate is withdrawn from the sump 17 by means of a pump 57 having a main discharge line 58 wherein a float controlled valve 59, responsive to the level of the distillate within the sump 17, is disposed to control the volume of flow of the distillate through the line 58 into the top of the heat exchanger distillate tube 39. The distillate is drained from the heat exchanger through a line 60 which may be connected to fresh water storage tanks or the like. The pump 57 also discharges a small quantity of the distillate into a line 61 wherein a manually operable flow control valve 62 is located. The line 61 is connected to the steam discharge conduit 20 on the upstream side of the compressor. The valve 62 is positioned to permit limited flow of the fresh water distillate into the steam on the upstream side of the compressor 21 so that in compression of the steam, the temperature thereof will not be unduly elevated and so that the capacity of the compressor in pounds of the steam handled will be quite high.

It will be readily understood from the foregoing general description that the sea water which is introduced to the plant for evaporation is preconditioned to facilitate evaporation thereof. More specifically, the sea water is introduced to the heat exchanger 36 to flow therethrough in the direction opposite to the direction of flow of the brine and distillate so as to receive heat therefrom. The preheated sea water is then de-aerated through two stages, the first occurring in the dome of the de-aerator wherein the sea water is whirled and the second stage occurring in the spill of the sea water over the de-aerating pans while steam and tramp air from the evaporator chest are directed into the spilling stream of sea water. Within the de-aerating and brine standpipe unit, the sea water is mixed with brine drawn from the evaporator so that the sea water-brine mixture will be at a higher temperature than the pure sea water and then the said mixture is introduced to the evaporator for vaporization.

The advantage of de-aerating and preheating the sea water and mixing the same with brine will be fully appreciated in a more detailed description of the plant operation with specific reference to flow rates, temperatures, and salt concentrations. However, before proceeding to a detailed description of the operation, the means for selecting and controlling the flow rate or capacity of the plant should be understood.

As mentioned above, the evaporator 10 and standpipe 41 are interconnected adjacent the bottom of the evaporator boiler by the brine pipe 47. It will be apparent that if the liquid in the evaporator boiler 11 covers the open bottom end of the reservoir discharge pipe 12, a column or body of liquid in the evaporator reservoir, in the presence of any pressure or vacuum existing therein, will be balanced by a corresponding column of liquid in the standpipe. The combination of the evaporator boiler, pipe 47 and the standpipe in effect constitutes a vented or "open" manometer.

Evaporation of the sea water-brine mixture in the boiler 11 tends to lower the liquid level therein and it may be expected that liquid would flow from the standpipe 41 to the boiler through the pipe 47. However, in accordance with the present invention, liquid is pumped from the standpipe at a rate in excess of the evaporation rate to induce evaporator-to-standpipe flow in the pipe 47. Part of the liquid (sea water-brine mixture) pumped from the standpipe is introduced to the evaporator reservoir through the line 52 to maintain the liquid level therein. The rest of the sea water-brine mixture which is pumped from the standpipe is introduced to the heat exchanger through the line 53 and is thereafter discharged from the plant through the pipe 56 and throttle valve 55.

This aforementioned evaporator-to-standpipe flow in the pipe 47 constitutes a concentrated brine flow and is necessary to achieve the desired mixture of sea water and brine in the standpipe.

From the foregoing explanation, it will be quite apparent that the supply needs of the plant are furnished through the standpipe 41 and that for stable operation (wherein the liquid levels in the evaporator and standpipe show no material changes), sea water must be added to the standpipe at a rate equal to the cumulative rate of distillate and sea water-brine discharge from the plant. The following explanation will reveal that the present invention encompasses means for automatically relating the sea water supply rate to the evaporator operating rate.

I have found that sea water flow to the plant can be automatically controlled by valve means responsive to the liquid level in the evaporator reservoir. More specifically, the metering valve 34 is located in the sea water feed line 32 for opening and closing movements therein when actuated by the float 35 in the evaporator reservoir 13. If the float drops with a decrease in the reservoir level, the valve 34 will be opened to increase the flow of sea water to the standpipe. If the float is elevated, the valve 34 will be moved toward closed position to decrease sea water flow. Thus, it will be seen that flow in the sea water line 32 is related to flow in the reservoir supply line 52.

The valve 54 is located in the said reservoir supply line to control the flow rate therein which may be shown on a conventional flow rate indicator 28 located on the upstream side of the valve 54. As previously mentioned, only a portion of the sea water-brine admitted to the reservoir is evaporated and the concentrated brine remainder thereof is, in accordance with the present invention, mixed with sea water in the standpipe. Therefore, the valve 54 should be set to supply sea water-brine to the reservoir at a rate which equals the sum of the evaporation rate and the rate at which brine is withdrawn from the boiler and mixed with sea water. If such rate balance is achieved, the liquid level in the reservoir will be constant and the valve 34 will remain in one position in the sea water supply line 32 to permit flow therethrough at a constant rate which may be shown in a conventional flow rate indicator 29 on the upstream side of the valve 34. If the flow rate in the sea water line is insufficient, the liquid level in the standpipe will drop and so will the level in the reservoir by increasing flow from evaporator to standpipe in the pipe 47. The drop in reservoir level opens the valve 34 to increase sea water flow thereby increasing standpipe level and also increasing reservoir level by decreasing evaporator-to-standpipe flow in the pipe 47. If the flow rate in the sea water line is too great, the liquid level in the standpipe will increase and so will the level in the reservoir by decreasing evaporator-to-standpipe flow in the pipe 47. The increase in reservoir level causes closing movement of the valve 34 to decrease sea water flow and lower the standpipe level which lowers the reservoir level by increasing evaporation-to-standpipe flow in the pipe 47.

The foregoing statements are predicated on the assumption that there is brine flow from the evaporator to the standpipe as will be brought about by admitting more sea water-brine to the reservoir than is being evaporated. Such must be the case if sea water and brine are to be mixed in the standpipe as has been found desirable. The evaporation rate for any specific basket temperature can be calculated and the valve 54 set for flow in excess of the evaporation rate to provide for evaporator-to-standpipe flow of the excess in the form of brine. Obviously, the flow to the reservoir as shown by the indicator 28 can be set so far in excess of the evaporation rate that most of the standpipe supply will come through the pipe 47 from the evaporator as re-circulated brine and only a small amount of sea water make-up flow will take place as shown by the indicator 29. This condition will tend to concentrate the sea water-brine mixture. On the other hand, if the reservoir supply rate is close to the evaporation rate, there will be little evaporator-to-standpipe flow in which event, substantially all standpipe supply will be in the form of sea water, tending toward a dilute sea water-brine mixture.

In further accord with the invention, the concentration of the sea water-brine mixture may be controlled for any rate of flow to the separator reservoir. This is accomplished by regulating the "overboard" flow of sea water-brine from the standpipe. More specifically, if the tendency is toward an unduly concentrated mixture, the sea water-brine discharge valve 55 may be opened to accommodate increased flow so far as to lower the standpipe level. As explained before, lowering the standpipe level lowers the reservoir level causing valve 34 to increase the sea water flow. Increasing sea water flow will, of course, dilute the mixture in the standpipe. If the tendency is toward a dilute mixture, the valve 55 may be closed which results in an increase in standpipe level and in reduced sea water flow.

It will be quite apparent that manipulation of the valve 55 will be reflected in changes in the reading of the sea water flow indicator 29. Therefore, it will be readily understood that a desired sea water-brine concentration can be maintained by operation of valve 55 to set the sea water flow indication with reference to reservoir flow as shown on the indicator 28.

For the purpose of more fully understanding flow rate and concentration control and for understanding details of operation, assume, for example, that it is required that the plant produce between 1000 and 1100 gallons of fresh water per day. This means that approximately ¾ gallon of distillate must be produced by the plant for each minute of operation. Experience with the apparatus has shown that to produce distillate with a known basket temperature at the rate of approximately ¾ gallon per minute and to maintain satisfactory concentration in keeping with heat exchange, the sea water-brine mixture must be introduced to the evaporator through the line 52 and valve 54 at the rate of approximately 2¼ gallons per minute. Therefore, the valve 54 is set to accommodate flow to the evaporator at the rate of 2¼ gallons per minute (g.p.m.) as shown in the indicator 28.

However, before flow to the evaporator can be accommodated at the full selected rate, the electric boiler 24 should be energized to generate steam for passage into the boiler basket 14 through the conduit 16. At this point, it should be understood that the electric boiler 24 contains a body of fresh water at the same level as the body of distillate in the sump 17. This can be accomplished by providing an interconnecting pipe 63 between the boiler and sump and the float controlled valve 59 can be adapted to shut off distillate discharge when the liquid bodies in the sump and electric boiler reach a preselected level. The steam which is generated in the electric boiler and passed to the evaporator boiler will flow from the evaporator basket 14 into the chest 25. A line 64 is used to interconnect the chest 25 and the steam dome 19 and a valve 65 is disposed in the said line to control flow therethrough. The valve 65 should be opened after the electric boiler is energized so that steam can be passed into the steam dome for withdrawal therefrom through the conduit 20 into the compressor 21. Upon being compressed and superheated, the steam is returned to the basket 14 to cause vaporization of the sea water-brine mixture within the boiler 11. After vaporization has been started and separated steam is passed into the steam dome 19, the valve 65 in the line 64 may be closed and the electric boiler 24 de-energized or substantially de-energized and evaporator operation will continue. The purpose of admitting "basket steam" to the dome 19 is to prevent the formation of a vacuum within the said dome and to provide a steam body for compression and introduction to the basket 14 so that sea water-brine evaporation will be expedited.

The temperature of the evaporated steam in the dome 19 and in the conduit 20 will be approximately 212° F. It is preferred that the steam be compressed by approximately 5 pounds. In passing through the compressor 21 and in such compression the temperature thereof will be increased to approximately 227° F. The compressed steam gives up heat to the sea water and condenses into the sump 17.

As previously mentioned, experience has shown that a reservoir supply rate of 2¼ g.p.m. is best suited to the production of distillate with a known basket temperature (the temperature of superheated steam admitted to the basket) at the rate of ¾ g.p.m. It has also been determined that sea water should be supplied to the standpipe at the rate of 2¼ g.p.m. to achieve a highly satisfactory sea water-brine concentration and to accommodate sufficient sea water-brine flow through the heat exchanger to preheat the sea water as described. Accordingly, the valve 55 is set for a 2¼ g.p.m. sea water flow as shown in the indicator 29. The flow of sea water to the standpipe being equal to the flow of sea water-brine to the reservoir, it is quite apparent that the discharge flow of sea water-brine from the standpipe is equal to the flow of brine from the evaporator to the standpipe through the pipe 47. Since ¾ g.p.m. is being evaporated, the brine flow through the pipe 47 is 1½ g.p.m. and, therefore, the sea water-brine flow through the heat exchanger and discharge pipe 56 is also 1½ g.p.m.

The concentration of salt and other solids in sea water is approximately 1 ounce per 32 ounces. Therefore, at the rate of 2¼ g.p.m., the sea water is introducing 9 ounces of salt and other solids to the plant during each minute of operation. Since the concentration of sea water-brine mixture remains constant, it will be readily understood that the same amount of salt and solids must be discharged from the plant for each minute of operation. All of the salt and solids are discharged from the plant in the sea water-brine mixture through the heat exchanger and discharge pipe 56 at the rate of 1½ g.p.m. Therefore, in order to discharge 9 ounces of solids per minute, it is quite apparent that the sea water-brine mixture comprises 1½ ounces of solids for every 32 ounces. Since the sea water-brine mixture introduced to the evaporator is at the same concentration, namely, 1½/32, it is quite apparent that at the rate of 2¼ g.p.m., there are 13½ ounces of salt and other solids introduced to the evaporator for each minute of operation. All of the salt and solids are discharged from the evaporator in the brine line at 1½ g.p.m. Therefore, the salt concentration of the brine in the pipe 47 can be readily calculated as 2¼ ounces per 32 ounces or 2¼/32. Thus, there are 13½ ounces of salt and other solids admitted to the standpipe through the brine pipe and 9 ounces of salt and other solids are admitted to the standpipe in the sea water, making a total of 22.5 ounces of salt and other solids added to the standpipe for each minute of operation. During each minute of operation, the total flow amounts to 3¾ gallons, 1½ gallons being admitted through the brine pipe and 2¼ gallons being admitted from the sea water line. Thus, the 3¾ g.p.m. of the total flow carries a total salt content of approximately 22.5 ounces so that the mixture comprises 1½/32 concentration. As previously pointed out, the sea water-brine mixture must comprise a 1½/32 concentration in the given example in order to discharge salt and other solids from the plant at the same rate of their introduction to the plant.

From the consideration of heat transfer, let it be assumed hat the sea water enters the plant and heat exchanger tube 38 at approximately 60° F. The distillate will enter the heat exchanger tube 39 at approximately 220° F., the temperature within the chest 25. The sea water-brine mixture which enters the heat exchanger tube 37 is at approximately 212° F., the temperature within the standpipe 41. The standpipe temperature is maintained at approximately 212° F. by the hot brine flowing from the evaporator boiler through the pipe 47 and by the compressed steam which enters the standpipe through the evaporator vent line 48 at approximately 220° F. In passing through the heat exchanger, the temperature of the sea water will change from approximately 60° F. to approximately 210° F., while the temperature of the distillate changes from approximately 220° F to approximately 70° F., and the temperature of the sea water-brine mixture in the tube 37 changes from approximately 212° F. to approximately 70° F.

The sea water which has had its temperature elevated to approximately 210° F. will more readily liberate its air when introduced to the de-aerator dome and spilled over the de-aerating pans. When mixed with the hot brine in the standpipe 41, the temperature of the resulting mixture will be elevated to approximately 212° F. as previously mentioned.

As a result, the sea water-brine mixture is introduced to the evaporator at or near its boiling temperature and with substantially all of its air removed. Obviously, vaporization and condensation are greatly facilitated by such preconditioning and preheating of the supply mixture for the evaporator.

The aforedescribed manometer action between the evaporator and standpipe is also utilized to actuate means for adding heat to the evaporator system when called upon to do so. More specifically, the standpipe 41 is fitted with a pair of glass sight gauges $g$ and $g'$ in vertical alignment to visually indicate the liquid level in the standpipe. There are also included a pair of electrical probes $p$ and $p'$ in the gauges $g$ and $g'$, respectively, to actuate relays for energizing heating elements in the boiler 24. While the probes might be located elsewhere, as for example in the standpipe, it is preferred that they be located in the sight gauges for convenient inspection and cleaning or the like.

If the liquid in the standpipe is below a desirable level due to maladjustment of the valves or for other reasons, the level in the evaporator will also be low and less liquid will be in contact with the evaporator basket 14 resulting in a low rate of steam generation and evaporation. This causes the pump or compressor 21 to pull a vacuum in its attempt to satisfy its operating capacity with a resulting disturbance of the heat balance.

Additional or make-up heat can be supplied the system by energizing one or more heating elements in the external boiler 24. The arrangement is such that the probes will actuate the relays to energize the heating elements when the liquid column in the sight gauges falls below preselected levels. Thus, liquid level conditions which might give rise to heat unbalance are immediately recognized and the heating elements are automatically energized to avoid the unbalance. Conversely, when the liquid level is high or at a selected point, the probes will open the relays to de-energize the heating elements.

It is significant to note that the manometer action is relatively independent of ambient pressure conditions and will, therefore, be relatively unaffected by ambient pressure conditions created by other equipment or by "snorkel" submarine operation. This is in contrast to other vapor compression type plants requiring the use of pressure bellows type controls which are affected by changing ambient conditions and which are relatively insensitive.

While the invention has been described with reference to one specific embodiment, it is not intended to limit the invention to the described embodiment otherwise than indicated by the claims which follow.

I claim as my invention:

1. In a sea water evaporating and distilling plant, the combination comprising an evaporator having a reservoir to maintain a column of liquid to be evaporated and also having a boiler chamber connected with the reservoir to receive liquid therefrom for evaporation, a standpipe adapted to maintain a column of liquid, a sea water inlet conduit connected to said standpipe, a pipe connected between said boiler chamber and said standpipe below the liquid levels in the reservoir and the standpipe to achieve liquid column balance between the evaporator reservoir and the standpipe, said pipe being connected to the boiler chamber to receive brine therefrom, a sea water-brine line connected between said standpipe and said reservoir, and a pump connected in said line to force standpipe-to-reservoir flow at a rate in excess of the rate of evaporation whereby brine will flow in said pipe from the evaporator to the standpipe to mix with sea water therein.

2. In a sea water evaporating and distilling plant, the combination comprising an evaporator having a reservoir to maintain a column of liquid to be evaporated and also having a boiler chamber connected with the reservoir to receive liquid therefrom for evaporation, a standpipe adapted to maintain a column of liquid, a sea water inlet conduit connected to said standpipe, a pipe connected between said boiler chamber and said standpipe below the liquid levels in the reservoir and the standpipe to achieve liquid column balance between the evaporator reservoir and the standpipe, said pipe being conected to the boiler chamber to receive brine therefrom, a sea water-brine line connected between said standpipe and said reservoir, a pump connected in said line to force standpipe-to-reservoir flow therein, a discharge conduit for said standpipe, a first throttle valve disposed in said line, and a second throttle valve disposed in said discharge conduit, said valves being adapted for regulation to cause liquid to flow from said standpipe at a rate in excess of the rate of evaporation plus the rate of flow in said inlet conduit whereby brine will flow in said pipe from the evaporator to the standpipe to mix with sea water therein.

3. In a sea water evaporating and distilling plant, the combination comprising an evaporator having a reservoir to maintain a column of liquid to be evaporated and also having a boiler connected with the reservoir to receive liquid therefrom for evaporation and further having a heat exchanger connectible with a source of steam to evaporate sea water in the boiler chamber and a chest connected with the heat exchanger for the collection and condensation of steam into a fresh water distillate, a standpipe adapted to maintain a column of liquid, a steam conduit connected between said chest and the standpipe, a sea water inlet conduit connected to said standpipe, a pipe connected between said boiler and said standpipe below the liquid levels in the reservoir and the standpipe to achieve liquid column balance between the evaporator reservoir and the standpipe, said pipe being connected to the boiler to receive brine therefrom, a sea water-brine line connected between said standpipe and said reservoir, and a pump connected in said line to force standpipe-to-reservoir flow at a rate in excess of the rate of evaporation whereby brine will flow in said pipe from the evaporator to the standpipe to mix with sea water therein.

4. In a sea water evaporating and distilling plant, the combination comprising a boiler chamber for the evaporation of sea water and a reservoir disposed over said boiler chamber with an open end conduit extending between the reservoir and the boiler chamber having its open ends submerged in liquid within the reservoir and boiler chamber, respectively, a standpipe, a sea water inlet conduit connected to said standpipe, a pipe connected between said boiler chamber and said standpipe for liquid flow therebetween to achieve liquid column balance between the reservoir and the standpipe, said pipe being connected to the boiler chamber to receive brine therefrom, a sea water-brine line connected between said standpipe and said reservoir, a pump connected in said line to force standpipe-to-reservoir flow therein, a discharge conduit for said standpipe, a first throttle valve disposed in said line, a second throttle valve disposed in said discharge conduit, and a metering valve disposed in said inlet conduit, said throttle valves being adapted for regulation to cause liquid to flow from said standpipe at a rate in excess of the rate of evaporation plus the rate of flow in said inlet conduit and said metering valve being adapted for opening and closing movements in said inlet conduit in response to decrease and increase, respectively, in the liquid level in said reservoir whereby flow in said inlet conduit is regulated to maintain liquid column balance between said reservoir and said standpipe at substantially constant levels while brine flows in said pipe from said evaporator to said standpipe for mixing with sea water therein.

5. In a sea water evaporating and distilling plant, the combination comprising an evaporator having a boiler chamber for the evaporation of sea water and a reservoir disposed over said boiler chamber with an open end conduit extending therebetween and having its open ends submerged in liquid within the reservoir and boiler chamber, respectively, a standpipe, a sea water inlet conduit connected to said standpipe, a pipe connected between said boiler chamber and said standpipe for liquid flow therebetween to achieve liquid column balance between the evaporator and the standpipe, said pipe being connected to the boiler chamber to receive brine therefrom, a sea water-brine line connected between said standpipe and said reservoir, a pump connected in said line to force standpipe-to-reservoir flow therein, a discharge conduit connected to said pump to discharge sea water-brine from said standpipe, a first throttle valve disposed in said line, a second throttle valve disposed in said discharge conduit, and a metering valve disposed in said inlet conduit, said throttle valves being adapted for regulation to cause liquid to flow from said standpipe at a rate in excess of the rate of evaporation plus the rate of flow in said inlet conduit and said metering valve being adapted to opening and closing movements in said inlet conduit in response to decrease and increase, respectively, in the liquid level in said reservoir whereby flow in said inlet conduit is regulated to maintain liquid column balance between said evaporator and said standpipe at substantially constant levels while brine flows in said pipe from said evaporator to said standpipe for mixing with sea water therein.

6. In a sea water evaporating and distilling plant, the combination comprising an evaporator having a boiler chamber and a distillate sump, a standpipe, a heat exchanger, a sea water inlet conduit extending through said heat exchanger and connected to said standpipe, a pipe connected between said boiler chamber and said standpipe to achieve liquid column balance therebetween and arranged to receive hot brine from the boiler chamber, a sea water-brine line connected between said standpipe and said evaporator, a pump connected in said line to force standpipe-to-evaporator flow therein, a discharge conduit for said standpipe extending through said heat exchanger, a distillate discharge line connected to said sump and extending through said heat exchanger whereby the sea water is heated by the standpipe discharge and by the distillate sump discharge, a first throttle valve disposed in said sea water-brine line, a second throttle valve disposed in the standpipe discharge conduit, and a metering valve disposed in said inlet conduit, said throttle valves being adapted for regulation to cause flow from said standpipe at a rate in excess of the rate of evaporation plus the rate of flow in said inlet conduit and said metering valve being adapted for opening and closing movements in said inlet conduit in response to decrease and increase, respectively, in the liquid level in said evaporator whereby flow in said inlet conduit is regulated to maintain liquid column balance between said evaporator and said standpipe at substantially constant levels while brine flows in said pipe from said evaporator to said standpipe for mixing with sea water therein.

7. A vapor compression type sea water evaporating and distilling plant comprising in combination an evaporator having a boiler chamber for the evaporation of sea water, and a chest defining a distillate sump below said boiler chamber, a closed shell disposed within said boiler chamber and having a port opening into said chest, a steam inlet conduit extending through said chest and said opening for introducing steam into said shell to evaporate the sea water in said boiler chamber whereby said steam will condense and flow through said opening into said sump, a steam outlet conduit extending from said evaporator to discharge sea water vapors therefrom, a compressor connected between said steam inlet and outlet conduits to compress the sea water vapors and pump the same into said steam inlet conduit, a boiler connected to said inlet conduit externally of said evaporator for generating steam to institute sea water evaporation, a standpipe, a sea water inlet conduit connected to said standpipe, a pipe connected between said boiler chamber and said standpipe to achieve liquid column balance between the evaporator and the standpipe, a sea water-brine line connected between said standpipe and said evaporator, a pump connected in said line to force standpipe-to-evaporator flow therein, a discharge conduit for said standpipe, a first throttle valve disposed in said line, a second throttle valve disposed in said standpipe discharge conduit, and a metering valve disposed in said sea water inlet conduit, said throttle valves being adapted for regulation to cause liquid to flow from said standpipe at a rate in excess of the rate of evaporation plus the rate of flow in said sea water inlet conduit and said metering valve being adapted for opening and closing movements in said inlet conduit in response to decrease and increase, respectively, in the liquid level in said evaporator whereby flow in said inlet conduit is regulated to maintain liquid column balance between said evaporator and said standpipe at substantially constant levels while brine flows in said pipe from said evaporator to said standpipe for mixing with sea water therein.

References Cited in the file of this patent

UNITED STATES PATENTS

| | | |
|---|---|---|
| 1,150,713 | Soderlund | Aug. 17, 1915 |
| 1,328,998 | Jones | Jan. 27, 1920 |
| 1,654,262 | Jones | Dec. 27, 1927 |
| 2,324,663 | Aiton | July 20, 1943 |
| 2,389,064 | Latham | Nov. 13, 1945 |
| 2,441,361 | Kirgan | May 11, 1948 |
| 2,445,907 | Davis | July 27, 1948 |
| 2,487,884 | Lunt | Nov. 15, 1949 |
| 2,515,648 | Hunt et al. | July 18, 1950 |
| 2,537,259 | Cleaver | Jan. 9, 1951 |
| 2,604,957 | Williamson et al. | July 29, 1952 |
| 2,619,453 | Anderson | Nov. 25, 1952 |
| 2,649,408 | Williamson et al. | Apr. 18, 1953 |

UNITED STATES PATENT OFFICE

CERTIFICATE OF CORRECTION

Patent No. 2,885,328                      May 5, 1959

William R. Williamson

It is hereby certified that error appears in the printed specification of the above numbered patent requiring correction and that the said Letters Patent should read as corrected below.

Column 4, line 31, for "facilitate" read — facilitated —; column 8, line 7, for "described" read — desired —; column 11, line 21, for "adapted to" read — adapted for —.

Signed and sealed this 25th day of August 1959.

(SEAL)
Attest:

KARL H. AXLINE
Attesting Officer

ROBERT C. WATSON
Commissioner of Patents